United States Patent
Liu et al.

(10) Patent No.: US 11,094,071 B1
(45) Date of Patent: Aug. 17, 2021

(54) EFFICIENT PARALLEL COMPUTING METHOD FOR BOX FILTER

(71) Applicant: SHANGHAITECH UNIVERSITY, Shanghai (CN)

(72) Inventors: Xinzhe Liu, Shanghai (CN); Fupeng Chen, Shanghai (CN); Yajun Ha, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 0 days.

(21) Appl. No.: 17/054,169

(22) PCT Filed: Jun. 17, 2020

(86) PCT No.: PCT/CN2020/096461
§ 371 (c)(1),
(2) Date: Nov. 10, 2020

(87) PCT Pub. No.: WO2021/036424
PCT Pub. Date: Mar. 4, 2021

(30) Foreign Application Priority Data

Aug. 26, 2019 (CN) .......................... 201910788715.0

(51) Int. Cl.
*G06T 7/44* (2017.01)
*G06F 9/38* (2018.01)
(Continued)

(52) U.S. Cl.
CPC .................. *G06T 7/44* (2017.01); *G06F 1/10* (2013.01); *G06F 9/30109* (2013.01); *G06F 9/3838* (2013.01); *G06F 9/545* (2013.01)

(58) Field of Classification Search
CPC ......... G06T 7/44; G06F 1/10; G06F 9/30109; G06F 9/3838; G06F 9/545
(Continued)

(56) References Cited

U.S. PATENT DOCUMENTS

| 7,889,923 B1 * | 2/2011 | Carr | ......................... G06T 5/008 382/168 |
| 8,781,234 B2 | 7/2014 | Zhang et al. | |
| 2011/0116727 A1 * | 5/2011 | Kwon | ....................... G06T 1/00 382/260 |

FOREIGN PATENT DOCUMENTS

| CN | 104571401 A | 4/2015 |
| CN | 110097514 A | 8/2019 |
| CN | 110648287 A | 1/2020 |

OTHER PUBLICATIONS

Christoph Rhemann et al., Fast Cost-Volume Filtering for Visual Correspondence and Beyond, CVPR, 2011, pp. 3017-3024.
(Continued)

*Primary Examiner* — Wednel Cadeau
(74) *Attorney, Agent, or Firm* — Bayramoglu Law Offices LLC

(57) ABSTRACT

An efficient parallel computing method for a box filter, includes: step 1, with respect to a given degree of parallelism N and a radius r of the filter kernel, establishing a first architecture provided without an extra register and a second architecture provided with the extra register; step 2, building a first adder tree for the first architecture and a second adder tree for the second architecture, respectively; step 3, searching the first adder tree and the second adder tree from top to bottom, calculating the pixel average corresponding to each filter kernel by using the first adder tree and the second adder tree, respectively, and counting resources required to be consumed by the first architecture and the second architecture, respectively; and, step 4, selecting one architecture consuming a relatively small resources from the first architecture and the second architecture for computing the box filter.

3 Claims, 3 Drawing Sheets

$$F(x,y) = \boxed{F(x-N,y)} - SS^-_{x-r+N} + SS^+_{x+r}$$
$$= \boxed{F(x-N,y)} - \sum_{x-r}^{} S_y + \sum_{x+r-N}^{} S_y$$

Need a buffer

(51) Int. Cl.
*G06F 1/10* (2006.01)
*G06F 9/30* (2018.01)
*G06F 9/54* (2006.01)

(58) Field of Classification Search
USPC .......................................................... 382/173
See application file for complete search history.

(56) References Cited

OTHER PUBLICATIONS

Honey Gupta et al., Implementation of Gaussian and Box kernel based Approximation of Bilateral Filter using OpenCL, DICTA, 2015.
Hadi Parandeh-Afshar et al., Compressor Tree Synthesis on Commercial High-Performance FPGAs, ACM Transactions on Reconfigurable Technology and Systems, Dec. 2011, pp. 1-19, vol. 4, No. 4.
Ziyang MA et al., Constant Time Weighted Median Filtering for Stereo Matching and Beyond, IEEE International Conference on Computer Vision, 2013, pp. 49-56.

* cited by examiner

EFFICIENT PARALLEL COMPUTING METHOD FOR BOX FILTER

CROSS REFERENCE TO THE RELATED APPLICATIONS

This application is the national phase entry of International Application No. PCT/CN2020/096461, filed on Jun. 17, 2020, which is based upon and claims priority to Chinese Patent Application No. 201910788715.0, filed on Aug. 26, 2019, the entire contents of which are incorporated herein by reference.

TECHNICAL FIELD

The present invention relates to a fast and efficient computing method for a box filter. Box filters are generally used in various image and video processing applications, they are also widely applied to implement other algorithms.

BACKGROUND

In the field of computer vision, there may be a need for many box filters in algorithms. The box filter, as a smooth filter, may be used for calculating an average of all pixels in a kernel. Therefore, the speed of implementation of each box filter should be sufficiently high so that not too much time is consumed even when a large quantity of box filters is used. Additionally, the implementation of the box filter should be more economical, so that it does not consume excessive resources.

In the past research projects, an attempt is made to accelerate box filters in different computing platforms, such as, a graphics processing unit (GPU) and a field programmable gate array (FPGA). In some researches, e.g., Christoph Rhemann, Asmaa Hosni, Michael Bleyer, Carsten Rother, and Margrit Gelautz, Fast cost-volume filtering for visual correspondence and beyond, CVPR 2011, pages 3017-3024, 2011; Ziyang Ma, Kaiming He, Yichen Wei, Jian Sun, and Enhua Wu, Constant time weighted median filtering for stereo matching and beyond, 2013 IEEE International Conference on Computer Vision, pages 49-56, 2013.; H. Gupta, D. S. Antony, and R. G. N., Implementation of gaussian and box kernel-based approximation of bilateral filter using OpenCL, and In 2015 International Conference on Digital Image Computing: Techniques and Applications (DICTA), pages 1-5, November 2015; a series of box filters are accelerated by using a GPU, and these box filters benefit from the better accessibility which is provided by CUDA/OpenCL. However, for a power-limited system, the FPGA has been becoming an increasingly competitive alternative solution. Some other researches disclosed an original method for implementing a box filter by using an FPGA is disclosed, see, Hadi Parandeh-Afshar, Arkosnato Neogy, Philip Brisk, and Paolo lenne, Compressor tree synthesis on commercial high-performance fpgas. TRETS, 4:39:1-39:19, 2011. Unfortunately, although the existing researches increase the speed of the box filter, a parallelization capability of the FPGA is not fully considered. Different from a common algorithm, such a zigzag scanning method, which the prior art discloses, requires the assistance of an additional row buffer to collaborate with other algorithms and would waste resources and places restrictions on the generality.

Typical methods for computing a box filter are as follow:
General method: the numbers in the kernel are simply added up one by one. In each round, such computing is performed as:

$$F(x, y) = \sum_{dy=-r}^{r} \sum_{dx=-r}^{r} I(x + dx, y + dy).$$

In the method, operations are independent of each other, so any degree of parallelism can be implemented to achieve a high speed. However, the computations in method are excessively complex, such as the $(2r+1)^2$ computing operations need to be averagely performed for each pixel. As a result, the implementation of this method consumes a large quantity of resources.

Integral image method: an integral image is defined as a sum of all pixels from the origin of coordinates to a current position. When this method is used, an integral image is calculated first using $$\text{Box}(x, y) = \sum_{x'=0}^{x} \sum_{y'=0}^{y} I(x', y').$$

Then, a final result is calculated by using the integral image: $F(x, =\text{Box}(x+r, y+r)-\text{Box}(x-r-1, y+r)-\text{Box}(x+r, y-r-1)+\text{Box}(x-r-1, y-r-1)$. This computing method requires the integral image to be buffered for subsequent computing. At least the intermediate results from formular $(2r+1)\times W+(2r+1)$ need to be buffered, and each result needs to —consume $\lceil \log_2 (W\times H)+n \rceil$ bits. This is excessively expensive and unacceptable for hardware implementation.

Partial sum method: partial sums are calculated first, and then a final result is calculated by using the partial sums. Such a computing method can save resources but has a high dependency and cannot be accelerated through parallelization.

SUMMARY

An objective of the present invention is to provide a fast and efficient computing method for a box filter.

To achieve the foregoing objective, the technical solution of the present invention is to provide an efficient parallel computing method for a box filter, the method includes: starting from an upper left corner of the box filter, a filter kernel moves from left to right and from top to bottom; assuming that a radius of the filter kernel is r, the filter kernel consists of (2r+1) columns of pixels, and each column of pixels consist of (2r+1) rows of pixels; the filter kernel moves by one column each time when moving from left to right, and moves by one row each time when moving from top to bottom; an average of all pixels within the filter kernel is defined as a pixel average; a pixel average corresponding to the filter kernel after each movement is then calculated, and pixel averages corresponding to all filter kernels are taken as a computing result of the box filter; calculation of the averages corresponding to all the filter kernels includes the following steps:

step 1: establishing two parallel architectures with respect to a given degree of parallelism N and the radius r of the filter kernel, one architecture is an architecture without an extra register, and the other architecture is an architecture with the extra register;

wherein in the architecture without the extra register, N pixel averages in all pixel averages formed during a left-to-right movement process of the filter kernels are calculated in parallel within each clock cycle, each pixel average is obtained by adding up all partial sums, and the partial sum is a sum of pixel values of one column of pixels;

in the architecture with the extra register, N pixel averages in all pixel averages that are formed during a left-to-right movement process of the filter kernels are calculated in parallel within each clock cycle; with respect to a current clock cycle T, the pixel averages of the positions of the N filter kernels in a previous clock cycle (T−1) are stored in the register, then a position $F_T(x, y)$ of any filter kernel in the current clock cycle T is obtained by moving a position $F_{T-1}(x, y)$ of the filter kernel in the previous clock cycle from left to right for N times, that is, $F_{T-1}(x, y)=F_T(x-N, y)$; assuming that a pixel average of the position $F_T(x, y)$ of the filter kernel in the current clock cycle T is $F_T(x, y)$, and a pixel average of the position $F_{T-1}(x, y)$ of the filter kernel in the previous clock cycle stored in the register is $F_{T-1}(x, y)$, then:

$F_T(x, y)=F_{T-1}(x, y)-SS^-+SS^+$, wherein, $SS^-$ represents a sum of pixel values of the N first columns of pixels, wherein a left edge of the position $F_{T-1}(x, y)$ of the filter kernel passes through the N first columns of pixels when the position $F_{T-1}(x, y)$ of the filter kernel moves from left to right for N times, and a sum of pixel values of each column of pixels of the N first columns of pixels is defined as a partial sum; $SS^+$ represents a sum of pixel values of the N second columns of pixels, wherein a right edge of the position $F_{T-1}(x, y)$ of the filter kernel passes through the N second columns of pixels when the position $F_{T-1}(x, y)$ of the filter kernel moves from left to right for N times, and a sum of pixel values of each column of pixels of the N second columns of pixels is defined as a partial sum;

step 2: building adder trees for the two architectures established in step 1, wherein adder trees that are built for the two architectures are defined as a first adder tree and a second adder tree, respectively, wherein two second adder trees are built for calculating each $SS^-$ and each $SS^+$, respectively;

step 3: searching the first adder tree and the second adder tree from top to bottom; calculating the pixel average corresponding to each filter kernel by using the first adder tree and the second adder tree, respectively, wherein identical partial sums that are used for computing a previous filter kernel are reused during computing of a current filter kernel; and counting resources required to be consumed by the two architectures established in step 1, respectively; and step 4: selecting an architecture, which is established in step 1, that consumes a relatively small resources for computing the box filter.

Preferably, constraint conditions of building the first adder tree are as follows: 1) inputs of the first adder tree are (2r+N) partial sums; 2) the first adder tree calculates N outputs simultaneously, and each output is a pixel average of the filter kernel; 3) each output is a sum of (2r+1) adjacent inputs;

a building manner of the first adder tree is as follows: 1) the first adder tree is built by combining a plurality of binary trees together and includes $[\log_2(2r+1)]+1$ layers in total, which are layer 0 to layer $[\log_2(2r+1)]$, respectively; 2) each node of layer 0 is one of the partial sums; indexes of initial elements of adjacent nodes in each layer from layer 1 to layer $[\log_2(2r+1)]$ have a difference of 2 in the inputs; the quantity of elements in each node of each layer is 2 to the power of a layer number; and the nodes in the layers of the first adder tree are combined in the following manner to obtain the outputs: 2r+1 is expressed by an M-digit binary number; a $1^{st}$ digit to an $M^{th}$ digit of the binary number from right to left correspond to layer 0 to layer M−1 of the first adder tree successively; in layers corresponding to digits with a value of 1 in the M-digit binary number, required nodes are searched from top to bottom and from left to right, and are combined to form the outputs.

Preferably, constraint conditions of building the second adder tree for calculating each $SS^-$ or each $SS^+$ are as follows: 1) inputs of the second adder tree are (2N−1) partial sums; 2) each output of the second adder tree is a sum of N adjacent inputs; 3) the second adder tree calculates N outputs simultaneously, and each output is one $SS^-$ or one $SS^+$;

a building manner of the second adder tree is as follows: 1) the second adder tree is built by combining a plurality of binary trees together and includes $\log_2 N+1$ layers in total, which are layer 0 to layer $\log_2 N$, respectively; 2) each node of layer 0 is one of the partial sums; the indexes of initial elements of the adjacent nodes in each layer from layer 1 have a difference of 2 in the inputs; 3) an $N^{th}$ node in layer 0 is combined with a $(N/2-1)^{th}$ node and a $(N/2)^{th}$ node in layer 1, respectively; a generated new node includes all elements of two parent nodes; the generated new node is still located in layer 1 and occupies a position identical to a position of a father node of the generated new node in layer 1; 4) during computing of layer 2, nodes including three elements in layer 1 are adopted preferentially, unless the condition 2) cannot be satisfied; and 5) a building manner of other layers are identical to the building manner of the first adder tree; and the nodes in the layers of the second adder tree are combined in the following manner to obtain the outputs: nodes are searched from top to bottom and from left to right, and are combined, and a next layer is searched if no suitable element is adopted for combination in a current layer.

The present invention proposes two architectures for implementing a box filter in parallel, and an adder tree is built to reduce required resources. The present invention has the following features.

(1) Based on the "partial sum" algorithm, the present invention proposes two architectures suitable for different parameter combinations, the two architectures eliminate intrinsic data dependency of an algorithm and therefore can achieve any degree of parallelism.

(2) The present invention reuses all intermediate results by using the adder trees, and greatly reduces computing resources required for algorithm parallelism.

(3) The present invention develops a program that automatically generates a box filter code according to an input parameter combination, and the code is accepted by a high-level synthesis tool.

DETAILED DESCRIPTION OF THE EMBODIMENTS

The present invention will be described in detail below in conjunction with specific embodiments. It should be understood that these embodiments are only used to describe the present invention and are not intended to limit the scope of the present invention. In addition, it should be understood that various changes and modifications may be made to the present invention by those skilled in the art after reading the content of the present invention, and these equivalent forms shall fall within the scope defined by the claims of the present invention.

Figure 1:
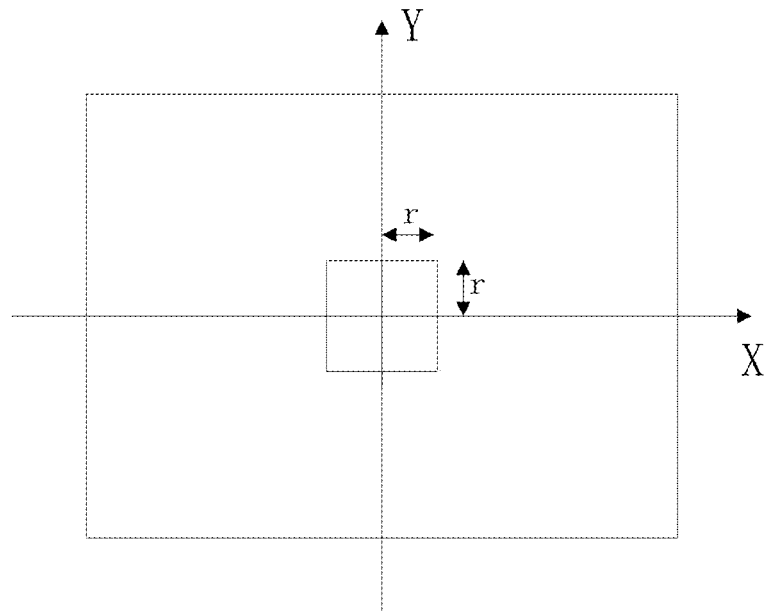
FIG. 1 is a schematic diagram of a design of a box filter according to the present invention.

As shown in FIG. 1, the external frame in FIG. 1 depicts a box filter, and the small frame in the center of the external frame depicts a filter kernel, wherein r is the radius of the filter kernel, which is an external input value when computing the box filter. A current position $F(x, y)$ of the filter kernel consists of $(2r+1)$ columns of pixels, and each column of pixels consist of $(2r+1)$ rows of pixels. An average of all pixels within the filter kernel is defined as a pixel average. X coordinate axis and Y coordinate axis are established by using a central pixel of the box filter as an origin. Then, a pixel average of the current position $F(x, y)$ of the filter kernel is $F(x, y)$, which is expressed as:

$$F(x, y) = \frac{1}{(2r+1)^2} \sum_{dy=-r}^{r} \sum_{dx=-r}^{r} I(X+dx, Y+dy),$$

wherein, $I(x, y)$ is a pixel value of a pixel in $x^{th}$ column and $y^{th}$ row in the current position $F(x, y)$ of the filter kernel, that is, a pixel value of a pixel at the coordinates $(x, y)$; $(X, Y)$ are coordinates of the central pixel of the current position $F(x, y)$ of the filter kernel; dx is a deviation with respect to X, and dy is a deviation with respect to Y.

When computing the box filter, starting from an upper left corner of the box filter, the filter kernel moves from left to right and from top to bottom. The filter kernel moves by one column each time when moving from left to right, and moves by one row each time when moving from top to bottom. Each time the filter kernel moves, a different pixel average is obtained. One objective of computing the box filter is to calculate all pixel averages.

Based on an existing "partial sum" algorithm, the present invention proposes two architectures that are suitable for different parameter combinations. The architectures eliminate intrinsic data dependency of an algorithm, and therefore can achieve any degree of parallelism. The "partial sum" algorithm is briefly introduced below.

Figure 2:
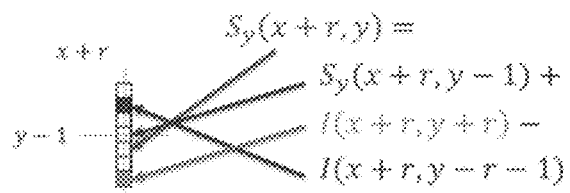
FIG. 2 is a schematic diagram of calculation of $S_y(x+r, y)$ according to the present invention.

With regard to a filter kernel with a radius of r, this method begins with calculating a sum of pixel values of $(2r+1)$ rows of pixels in each column of pixels. For example, for the $(x+r)^{th}$ column of pixels, a sum of pixel values of $(2r+1)$ rows of pixels in the $x+r^{th}$ column is defined as $S_y(x+r, y)$, as shown in FIG. 2. A previous calculation result $S_y(x+r, y-1)$ is adopted during the calculation of $S_y(x+r, y)$, and the previous calculation result $S_y(x+r, y-1)$ is a sum of pixel values of a corresponding column of pixels obtained by moving the current $(x+r)^{th}$ column of pixels upward by one row. Then, letting $S_y(x+r, y)=S_y(x+r, y-1)+I(x+r, y+r)-I(x+r, y-r-1)$, that is, the current $(x+r)^{th}$ column of pixels is regarded as being obtained by moving a column of pixels at the same position downward by one row. When the column of pixels is moved downward, an upper edge of the column of pixels passes through a first pixel when being moved downward, and a pixel value of the first pixel is $I(x+r, y-r-1)$; meanwhile, when the column of pixels is moved downward, a lower edge of the column of pixels passes through a second pixel when being moved downward, and a pixel value of the second pixel is $I(x+r, y+r)$. Subsequently, the sum of each column of pixels is used for calculating a pixel average of the filter kernel.

Figure 3:
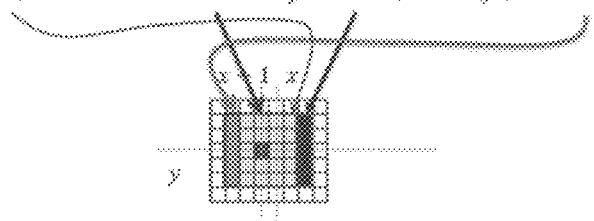
FIG. 3 is a schematic diagram of calculation of F(x, y) according to the present invention.

As shown in FIG. 3, a pixel average $F(x, y)$ in the current position $F(x, y)$ of the filter kernel is expressed as: $F(x, y)=F(x-1, y)+S_y(x+r, y)-S_y(x-r-1, y)$, wherein $F(x-1, y)$ is an average of all pixels in a previous position $F(x-1, y)$ of the filter kernel before the current position $F(x, y)$ of the filter kernel is moved from left to right; $(X, Y)$ is the coordinates of a central pixel of the current position $F(x, y)$ of the filter kernel; $S_y(X+r, y)$ represents a sum of pixel values of the $(X+r)^{th}$ column of pixels, and $S_y(X-r-1, y)$ represents a sum of pixel values of the $(X-r-1)^{th}$ column of pixels. That is, the previous position $F(x-1, y)$ of the filter kernel is moved from left to right by one column to form the current position $F(x, y)$ of the filter kernel. In this case, $S_y(X+r, y)$ corresponds to a sum of pixel values of a first column of pixels, wherein a right edge of the previous position $F(x-1, y)$ of the filter kernel passes through the first column of pixels during movement, and $S_y(X-r-1, y)$ corresponds to a sum of pixel values of a second column of pixels, wherein a left edge of the previous position $F(x-1, y)$ of the filter kernel passes through the second column of pixels during movement.

It is expected to calculate a plurality of pixel averages in parallel to increase a computing speed. Assuming that a specified degree of parallelism is N, N pixel averages are expected to be obtained simultaneously: $F(x, y)$, $F(x+1, y)$, $F(x+2, y)$, ..., $F(x+N-1, y)$. This requires the processes of calculating these final results to be independent of each other, as the original partial sum calculation formula is $F(x, y)=F(x-1, y)+S_y(X+r, y)-S_y(X-r-1, y)$, it can be seen that the calculation of $F(x, y)$ depends on the computing result of $F(x-1, y)$.

The present invention designs two parallel architectures for a given degree of parallelism N and the radius r of the filter kernel, one architecture is an architecture without an extra register, and the other architecture is an architecture with the extra register.

Figure 4:
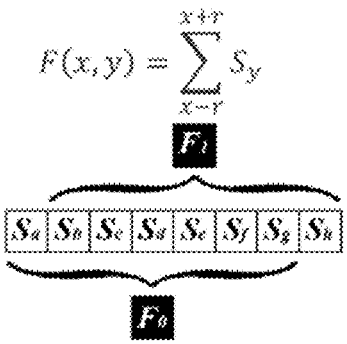
FIG. 4 is a schematic diagram of calculation of pixel averages of filter kernels used in an architecture without an extra register according to the present invention.

In the architecture without an extra register, during the calculation of a final result, all the partial sums are directly added up without using the previous calculation result, where each partial sum is a sum of pixel values of one column of pixels. For example, if the degree of parallelism N=2, a pixel average $F_0$ and a pixel average $F_1$ need to be calculated simultaneously. The calculation manner is as shown in FIG. 4. In FIG. 4, $S_a$ to $S_h$ are the sums of the pixel values of different columns of pixels; then, the pixel average $F_0$ is an accumulation of $S_a$ to $S_g$, and the pixel average $F_1$ is an accumulation of $S_b$ to $S_h$. In the architecture without an extra register, a formula for calculating a pixel average may be summarized as follows:

$$F(x, y) = \sum_{x=X-r}^{x=X+r} S_y(x, y)$$

wherein, $S_y(x, y)$ represents a sum of pixel values of the $x^{th}$ column of pixels, and (X, Y) is a central pixel of the current position of the filter kernel.

In the architecture with an extra register, the pixel averages of N filter kernels in an identical row are calculated at a time within each clock cycle; with respect to a current clock cycle T, the pixel averages of N filter kernels in a previous clock cycle (T−1) are stored in the register; then, a position $F_T(x, y)$ of any filter kernel in the current clock cycle T is obtained by moving a position $F_{T-1}(x, y)$ of the filter kernel in the previous clock cycle from left to right for N times, that is, $F_{T-1}(x, y)=F_T(x-N, y)$; assuming that the pixel average of the position $F_T(x, y)$ of the filter kernel in the current clock cycle T is $F_T(x, y)$, and the pixel average of the position $F_{T-1}(x, y)$ of the filter kernel in the previous clock cycle stored in the register is $F_{T-1}(x, y)$, then:

$F_T(x, y)=F_{T-1}(x, y)-SS^-+SS^-$, wherein $SS^-$ represents a sum of pixel values of the N first columns of pixels, wherein a left edge of the position $F_{T-1}(x, y)$ of the filter kernel passes through the N first columns of pixels when the position $F_{T-1}(x, y)$ of the filter kernel moves from left to right for N times, and a sum of pixel values of each column of pixels is defined as a partial sum, $$SS^- = \sum_{x=X-r}^{x=X-r+N} S_y(x, y);$$

$SS^-$ represents a sum of pixel values of the N second columns of pixels, wherein a right edge of the position $F_{T-1}(x, y)$ of the filter kernel passes through the N second columns of pixels when the position $F_{T-1}(x, y)$ of the filter kernel moves from left to right for N times, and a sum of pixel values of each column of pixels is defined as a partial sum, $$SS^+ = \sum_{x=X+r-N}^{x=X+r} S_y(x, y);$$

Figure 5:
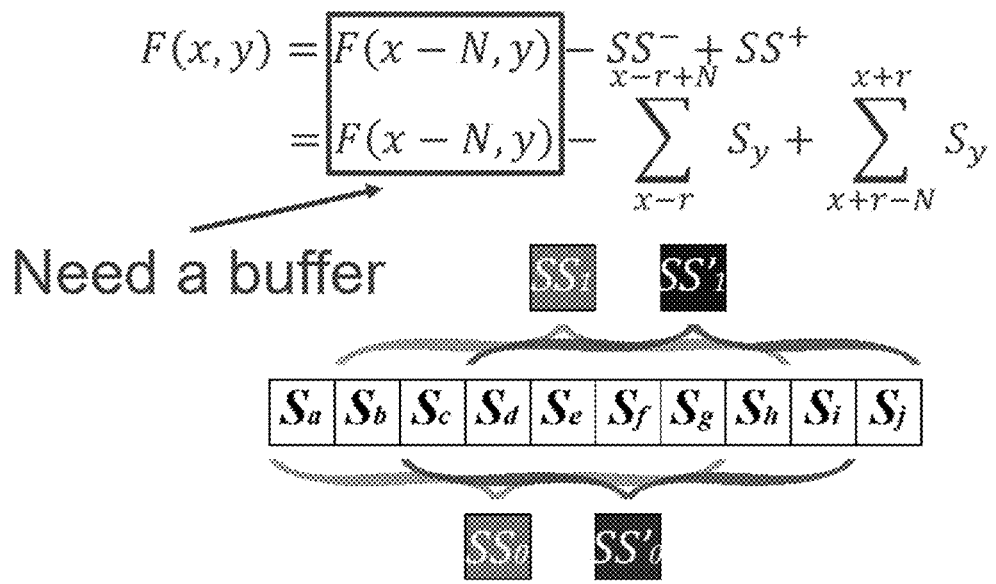
FIG. 5 is a schematic diagram of calculation of pixel averages of filter kernels used in an architecture with an extra register according to the present invention.

For example, if the degree of parallelism N=2, a pixel average $F_0$ and a pixel average $F_1$ need to be calculated simultaneously. A calculation manner is as shown in FIG. 5. In FIG. 5, $S_a$ to $S_j$ are sums of pixel values of different columns of pixels, and $F_0'$ and $F_0'$ are pixel averages in a previous clock cycle that are stored in the register; then $F_0=F_0'-S_a-S_b+S_h+S_i$, $F_1=F_1'-S_b-S_c+S_i+S_j$.

It is assumed that the degree of parallelism N=6, and the radius r of the filter kernel is 4, in the process of calculating the final result F(x, y) by using partial sums of $S_y(x, y)$, the following operations are performed:

A) With respect to the architecture without an extra register, according to the formula in FIG. 4, the operations in the following six formulas need to be performed simultaneously, and a total of 2Nr=48 adders are required:

$F_0=S_a+S_b+S_c+S_d+S_e+S_f+S_g+S_h+S_i$     vii.

$F_1=S_b+S_c+S_d+S_e+S_f+S_g+S_h+S_i+S_j$     viii.

$F_2=S_c+S_d+S_e+S_f+S_g+S_h+S_i+S_j+S_k$     ix.

$F_3=S_d+S_e+S_f+S_g+S_h+S_i+S_j+S_k+S_l$     x.

$F_4=S_e+S_f+S_g+S_h+S_i+S_j+S_k+S_l+S_m$     xi.

$F_5=S_f+S_g+S_h+S_i+S_j+S_k+S_l+S_m+S_n$     xii.

B) With respect to the architecture with an extra register, according to the formula in FIG. 5, the operations in the following twelve formulas need to be performed simultaneously, and a total of 2N(N−1)=60 adders are required:

$SS_0^-=S_a+S_b+S_c+S_d+S_e+S_f$     xiii.

$SS_1^-=S_b+S_c+S_d+S_e+S_f+S_g$     xiv.

$SS_2^-=S_c+S_d+S_e+S_f+S_g+S_h$     xv.

$SS_3^-=S_d+S_e+S_f+S_g+S_h+S_i$     xvi.

$SS_4^-=S_e+S_f+S_g+S_h+S_i+S_j$     xvii.

$SS_5^-=S_f+S_g+S_h+S_i+S_j+S_k$     xviii.

$SS_0^+=S_j=S_k+S_l+S_m+S_n+S_o$     xix.

$SS_1^+=S_k+S_l+S_m+S_p+S_o+S_p$     xx.

$SS_1^+=S_l+S_m+S_n+S_o+S_p+S_q$     xxi.

$SS_3^+=S_m+S_n+S_o+S_p+S_q+S_r$     xxii.

$SS_4^+=S_n+S_o+S_p+S_r+S_r++S_s$     xxiii.

$SS_5^+=S_o+S_p+S_q+S_r+S_s+S_t$     xxiv.

The present invention reuses all intermediate results in the foregoing architectures by using the adder trees, which greatly reduces computing resources required for algorithm parallelism.

The first adder tree is applicable to the architecture without an extra register, and it is used to perform the operation process in the foregoing step A). The quantity of required adders is decreased to 20 after using the first adder tree.

The first adder tree is built through the following aspects:
I) Requirements
 1) 2r+N inputs are needed. For example, in the foregoing step A), N=6 and r=4, then, there are a total of fourteen inputs, namely $S_a$ to $S_n$.
 2) Each output is a sum of 2r+1 adjacent inputs. For example, in the foregoing step A), r=4, then, the output F is a sum of nine S.
 3) N outputs are calculated simultaneously. For example, in the foregoing step A), N=6, then, six outputs, namely $F_0$ to $F_5$, are calculated simultaneously.
II) Tree Building Method
 1) The first adder tree is built by combining a plurality of binary trees together, and it includes [$\log_e$ (2r+1)]+1 layers, which are layer 0 to layer [$\log_e$ (2r+1)], respectively.
 2) Indexes of initial elements of adjacent nodes in each layer have a difference of 2 in the inputs.
 3) The quantity of elements contained in each node of each layer is 2 to the power of a layer number.

Figure 6:
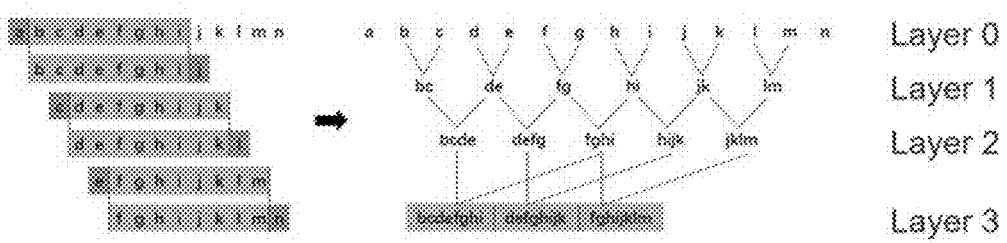
FIG. 6 is a schematic diagram of building the first adder tree according to the present invention.

As shown in FIG. 6, from a to n are sums of pixel values of different columns of pixels, namely, the inputs, which are nodes in layer 0; elements of nodes contained in layer 1 are bc, de, and the like. Elements of nodes contained in other layers are obtained in the same manner.

III) Combination Manner

2r+1 is expressed in a binary manner. In layers corresponding to digits with a value of 1, required nodes are searched from top to bottom and from left to right, and are combined.

For example, assume 2r+1=19=10011. Then, nodes need to be searched in layer 4, layer 1, and layer 0 and combined, and an output is obtained after the combination.

The second adder trees are applicable to the architecture with an extra register, and are used for calculating each $SS^-$ and each $SS^+$, respectively, for example, to perform the operation process of $SS_0^-$ to $SS_5^-$ in step B) or the operation process of $SS_0^+$, to $SS_5^+$ in step B). The quantity of the required adders is decreased to 32 after using the second adder trees.

The second adder tree for calculating $SS^-$ is built through the following aspects, (note, the second adder tree for calculating $SS^+$ is built in the same manner).

I) Requirements 1) 2N−1 inputs are needed. For example, in the foregoing step B), N=6 and r=4, then, there are a total of eleven inputs, namely $S_a$ to $S_k$.

2) Each output is a sum of N adjacent inputs. For example, in the foregoing step B), N=6, then, the output SS is a sum of six S.

3) N outputs are calculated simultaneously. For example, in the foregoing step B), N=6, then, six outputs, namely $SS_0^-$ to $SS_5^-$ are calculated simultaneously.

II) Tree Building Method

1) The second adder tree is built by combining a plurality of binary trees together, including $\log_2 N+1$ layers, which are layer 0 to layer $\log_2 N$, respectively.

2) Indexes of initial elements of adjacent nodes in each layer have a difference of 2 in the inputs.

3) The $N^{th}$ input element (in layer 0) is combined with the $(N/2−1)^{th}$ node and the $(N/2)^{th}$ node in layer 1, respectively, and the generated new node includes all elements of two parent nodes. The generated new node is still located in layer 1 and occupies the position identical to the position of the father node thereof in layer 1.

4) During computing of layer 2, nodes including three elements in layer 1 are adopted preferentially, unless the condition 2) cannot be satisfied.

5) Building manners of other layers are the same as that of the first adder tree in the architecture without an extra register.

Figure 7:
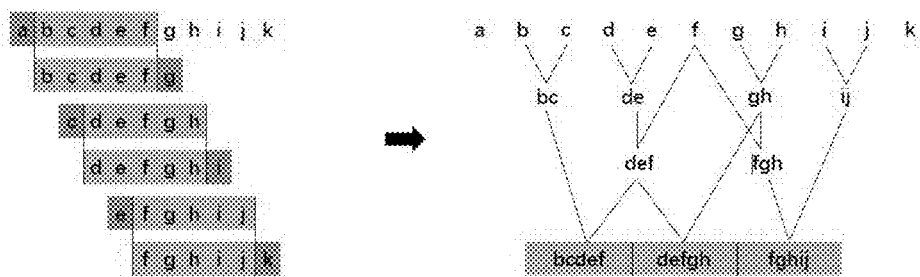
FIG. 7 is a schematic diagram of building the second adder tree according to the present invention.

As shown in FIG. 7, a to k are sums of pixel values of different columns of pixels, namely, the inputs, which are nodes in layer 0.

III) Combination Manner

Nodes are searched from top to bottom and from left to right, and are combined, and the next layer is searched if no suitable element is used for combination in the current layer.

After using the second adder tree, operations in step A) and step B) are converted as follows.

With respect to the architecture without an extra register, the following operations are performed, and a total of twenty adders are required:

$tmp\_bc=S_b+S_c;\ tmp\_de=S_d+S_e;\ tmp\_fg=S_f+S_g;$ xii.

$tmp\_hi=S_h+S_i;\ tmp\_jk=S_j+S_k;\ tmp\_lm=S_l+S_m;$ xiii.

$tmp\_bcde=tmp\_bc+tmp\_de;\ tmp\_defg=tmp\_de+tmp\_fg;$ xiv.

$tmp\_fghi=tmp\_fg+tmp\_hi;\ tmp\_hijk=tmp\_hi+tmp\_jk;$ xv.

$tmp\_jklm=tmp\_jk+tmp\_lm;$ xvi.

$tmp\_bcdefghi=tmp\_bcde+tmp\_fghi;$ xvii.

$tmp\_defghijk=tmp\_defg+tmp\_hijk;$ xviii.

$tmp\_fghihklm=tmp\_fghi+tmp\_jklm;$ xix.

$F_0=S_a+tmp\_bcdefghi;\ F_1=tmp\_bcdefghi+S_j;$ xx.

$F_2=S_c+tmp\_defghijk;\ F_3=tmp\_defghijk+S_l;$ xxi.

$F_4=S_e+tmp\_fghihklm;\ F_5=tmp\_fghihklm+S_n;$ xxii.

The present invention further develops a program that can automatically generate a box filter code according to an input parameter combination, and the code can be accepted by a high-level synthesis tool:

a) the program includes two sets of manned-programmed code templates, which adopts the two parallel architectures described above, respectively;

b) the program reads input parameters (the degree of parallelism N and the radius r of the filter kernel), and then generates the adder trees corresponding to the two architectures according to the foregoing rules;

c) the program searches the adder trees from top to bottom to generate the code, and counts resources required to be consumed by the two architectures; and d) a solution that consumes a relatively small resources is selected after comparison, the code template is filled, and C++ code acceptable to a high-level synthesis tool is output.

What is claimed is:

1. A parallel computing method for a box filter, wherein, a filter kernel is initially located on an upper left corner of the box filter, and moves from left to right and from top to bottom; assuming that a radius of the filter kernel is r, the filter kernel consists of (2r+1) columns of pixels, and each column of pixels of the (2r+1) columns of pixels consist of (2r+1) rows of pixels; the filter kernel moves by one column each time when moving from left to right, and moves by one row each time when moving from top to bottom; an average of all pixels within the filter kernel is defined as a pixel average; the pixel average corresponding to the filter kernel after each movement is calculated, and the pixel averages corresponding to all filter kernels are taken as a computing result of the box filter; the averages corresponding to all the filter kernels are calculated by the parallel computing method comprising the following steps:

step 1: establishing two parallel architectures with respect to a given degree of parallelism N and the radius r of the filter kernel, a first architecture of the two parallel architectures is provided without an extra register, and a second architecture of the two parallel architectures is provided with the extra register;

wherein in the first architecture, N first pixel averages in all pixel averages formed during a left-to-right movement process of the filter kernels are calculated in parallel within each clock cycle, each pixel average of the N first pixel averages is obtained by adding up all partial sums, and a partial sum is a sum of pixel values of one column of pixels;

in the second architecture, N second pixel averages in all pixel averages formed during the left-to-right movement process of the filter kernels are calculated in parallel within each clock cycle; with respect to a current clock cycle T, pixel averages of N filter kernels in a previous clock cycle (T−1) are stored in the extra register, then a position $F_T(x, y)$ of the filter kernel of the N filter kernels in the current clock cycle T is obtained by moving a position $F_{T-1}(x, y)$ of the filter kernel in the previous clock cycle from left to right for N times, that is, $F_{T-1}(x, y)=F_T(x-N, y)$; assuming that a pixel average of the position $F_T(x, y)$ of the filter kernel in the current clock cycle T is $F_T(x, y)$, and a pixel average of the position $F_{T-1}(x, y)$ of the filter kernel in the previous clock cycle stored in the extra register is $F_{T-1}(x, y)$, then:

$F_T(x, y)=F_{T-1}(x, y)-SS^-+SS^+$, wherein, $SS^-$ represents a sum of pixel values of N first columns of pixels, wherein a left edge of the position $F_{T-1}(x, y)$ of the filter kernel passes through the N first columns of pixels when the position $F_{T-1}(x, y)$ of the filter kernel moves from left to right for N times, and a sum of pixel values of each column of pixels of the N first columns of pixels is defined as a first partial sum; $SS^+$ represents a sum of pixel values of N second columns of pixels, wherein a right edge of the position $F_{T-1}(x, y)$ of the filter kernel passes through the N second columns of pixels when the position $F_{T-1}(x, y)$ of the filter kernel moves from left to right for N times, and a sum of pixel values of each column of pixels of the N second columns of pixels is defined as a second partial sum;

step 2: building a first adder tree for the first architecture and a second adder tree for the second architecture, respectively, wherein two second adder trees are built for calculating each $SS^-$ and each $SS^+$, respectively;

step 3: searching the first adder tree and the second adder tree from top to bottom; calculating the pixel average corresponding to each filter kernel by using the first adder tree and the second adder tree, respectively, wherein identical partial sums used for computing a previous filter kernel are reused during computing of a current filter kernel; and counting resources required to be consumed by the first architecture and the second architecture, respectively; and step 4: selecting one architecture consuming a relatively small resources from the first architecture and the second architecture for computing the box filter.

2. The parallel computing method according to claim 1, wherein constraint conditions of building the first adder tree comprise: 1) first inputs of the first adder tree are (2r+N) partial sums; 2) the first adder tree calculates N outputs simultaneously, and each output of the N outputs of the first adder tree is the pixel average of the filter kernel; 3) the each output of the N outputs of the first adder tree is a sum of (2r+1) adjacent first inputs;

a building manner of the first adder tree comprises: 1) the first adder tree is built by combining a first plurality of binary trees together and the first adder tree comprises $[\log_2(2r+1)]+1$ layers in total from a $0^{th}$ layer to a $([\log_2(2r+1)])^{th}$ layer 2) each node of the $0^{th}$ layer of the first adder tree is one of the (2r+N) partial sums; indexes of initial elements of adjacent nodes in each layer from a $1^{st}$ layer to the $([\log_2(2r+1)])^{th}$ layer of the first adder tree have a difference of 2 in the first inputs; a quantity of elements in each node of each layer from the $0^{th}$ layer to the $([\log_2(2r+1)])^{th}$ layer of the first adder tree is 2 to a power of a layer number; and nodes in the $[\log_2(2r+1)]+1$ layers of the first adder tree are combined in the following manner to obtain the N outputs: 2r+1 is expressed by an M-digit binary number; a $1^{st}$ digit to an $M^{th}$ digit of the M-digit binary number from right to left correspond to the $0^{th}$ layer to a $(M-1)^{th}$ layer of the first adder tree successively; in layers corresponding to digits with a value of 1 in the M-digit binary number, required nodes are searched from top to bottom and from left to right, and are combined to form the N outputs.

3. The parallel computing method according to claim 2, wherein constraint conditions of building the second adder tree for calculating each $SS^-$ or each $SS^+$ comprises: 1) second inputs of the second adder tree are (2N−1) partial sums; 2) each output of N outputs of the second adder tree is a sum of N adjacent second inputs; 3) the second adder tree calculates the N outputs simultaneously, and the each output of the N outputs of the second adder tree is one $SS^-$ or one $SS^+$, a building manner of the second adder tree comprises: 1) the second adder tree is built by combining a second plurality of binary trees together and the second adder tree comprises $\log_2 N+1$ layers in total from a $0^{th}$ layer to a $(\log_2 N)^{th}$ layer; 2) each node of the $0^{th}$ layer of the second adder tree is one of the (2N−1) partial sums; indexes of initial elements of adjacent nodes in each layer from a $1^{st}$ layer to the $(\log_2 N)^{th}$ layer of the second adder tree have the difference of 2 in the second inputs; 3) an $N^{th}$ node in the $0^{th}$ layer of the second adder tree is combined with a $(N/2-1)^{th}$ node and a $(N/2)^{th}$ node in the $1^{st}$ layer of the second adder tree, respectively, to generate a new node; the new node comprises all elements of two parent nodes; the new node is still located in the $1^{st}$ layer of the second adder tree and occupies a position identical to a position of a father node of the new node in the $1^{st}$ layer of the second adder tree; 4) during computing of a $2^{nd}$ layer of the second adder tree, nodes comprising three elements in the $1^{st}$ layer of the second adder tree are adopted preferentially, unless the condition 2) are not satisfied; and 5) a building manner of layers from a $3^{rd}$ layer to the $(\log_2 N)^{th}$ layer of the second adder tree are identical to the building manner of the first adder tree; and nodes in the $\log_2 N+1$ layers of the second adder tree are combined in the following manner to obtain the N outputs: nodes in a current layer are searched from top to bottom and from left to right, and are combined, and a next layer is searched if no suitable element is adopted for combination in the current layer.

* * * * *